US012680567B1

(12) United States Patent
Kurade et al.

(10) Patent No.: US 12,680,567 B1
(45) Date of Patent: Jul. 14, 2026

(54) RETAINER RING HAVING A TRAPEZIUM-SHAPED CROSS-SECTION

(71) Applicant: GM GLOBAL TECHNOLOGY OPERATIONS LLC, Detroit, MI (US)

(72) Inventors: Vishvjit Vitthal Kurade, Bangalore (IN); Shylesh Kumar P B, Bangalore (IN); Sunil Kumar, Bangalore (IN); Vikram Kumar Reddy, Nandyal (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/219,542

(22) Filed: May 27, 2025

(51) Int. Cl.
*F16D 13/68* (2006.01)
*F16B 21/18* (2006.01)

(52) U.S. Cl.
CPC ............ *F16B 21/183* (2013.01); *F16D 13/68* (2013.01)

(58) Field of Classification Search
CPC ............................... F16B 21/183; F16D 13/68
See application file for complete search history.

(56) References Cited

U.S. PATENT DOCUMENTS

| | | | | |
|---|---|---|---|---|
| 4,014,619 | A | * | 3/1977 | Good .................... F16D 65/123 403/359.5 |
| 5,632,354 | A | * | 5/1997 | Kashiwase ........... B60K 17/344 180/374 |
| 2007/0001450 | A1 | * | 1/2007 | Swift ...................... F16L 37/06 285/321 |
| 2008/0216582 | A1 | * | 9/2008 | Oberdier ................ G01L 1/125 327/516 |
| 2011/0297503 | A1 | * | 12/2011 | Szuba ................... F16D 13/683 192/112 |
| 2016/0298457 | A1 | * | 10/2016 | Edwards ................... F01D 5/10 |
| 2018/0259106 | A1 | * | 9/2018 | Deschamps ............. F16L 11/02 |
| 2019/0128275 | A1 | * | 5/2019 | Boulden ............... F04D 29/126 |

* cited by examiner

*Primary Examiner* — Farhana Pervin

(57) ABSTRACT

A component system includes a first component having a first surface. The first surface includes an annular groove. A second component is positioned on the first surface of the first component adjacent to the annular groove. A retainer ring is positioned in the annular groove to limit axial movement of the second component relative to the first component. The retainer ring includes a trapezium-shaped cross-section including an outwardly facing edge and an inwardly facing edge. One of the outwardly facing edge and the inwardly facing edge is positioned in the annular groove and the other of the outwardly facing edge and the inwardly facing edge includes an angled surface configured to selectively engage with the second component.

20 Claims, 6 Drawing Sheets

RETAINER RING HAVING A
TRAPEZIUM-SHAPED CROSS-SECTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to the art of mechanical fasteners and, more particularly, to a retaining ring having a trapezium-shaped cross-section.

Retaining rings, or split rings are widely used to constrict relative axial movement between two or more components. The retaining ring may be installed on an outer diameter of a shaft or on an inner diameter of a component, such as a gear, a bushing, a housing, or the like mounted on the shaft. Retaining rings are available in a variety of sizes, shapes, and types. For example, axially assembled retainer rings are installed in a groove machined into a shaft or bore. Bowed retainer rings include curved surfaces that may exert a preload on a component to be retained. Beveled retainer rings include an angled surface that nests within a groove having a corresponding angled wall. The angled surface forces the retaining ring to wedge itself against the angled wall of the component to be retained when exposed to an axial force.

SUMMARY

A component system, in accordance with the present disclosure, includes a first component having a first surface. The first surface includes an annular groove. A second component is positioned on the first surface of the first component adjacent to the annular groove. A retainer ring is positioned in the annular groove to limit axial movement of the second component relative to the first component. The retainer ring includes a trapezium-shaped cross-section including an outwardly facing edge and an inwardly facing edge. One of the outwardly facing edge and the inwardly facing edge is positioned in the annular groove and the other of the outwardly facing edge and the inwardly facing edge includes an angled surface configured to selectively engage with the second component.

In other features, the angled surface includes an angle of between about 30-degrees and about 50-degrees.

In other features, the angled surface includes an angle of about 38-degrees.

In other features, the angled surface includes an aspect ratio of between about 1 and about 2.

In other features, the angled surface includes an aspect ratio of about 1.5.

In other features, the angled surface includes a contact zone configured to selectively engage the second component.

In other features, the contact zone is defined at about a mid-point of the angled surface.

An automatic transmission includes a housing having an inner surface. A first transmission component is mounted for axial movement in the housing. The first transmission component includes a first surface having an annular groove. A second transmission component is supported on the first surface adjacent to the annular groove. A retainer ring is positioned in the annular groove to limit axial movement of the second transmission component relative to the first transmission component. The retainer ring includes a trapezium-shaped cross-section including an outwardly facing edge and an inwardly facing edge. One of the outwardly facing edge and the inwardly facing edge is positioned in the annular groove and the other of the outwardly facing edge and the inwardly facing edge includes an angled surface configured to selectively engage with the second transmission component.

In other features, the angled surface includes an angle of between about 30-degrees and about 50-degrees.

In other features, the angled surface includes an angle of about 38-degrees.

In other features, the angled surface includes an aspect ratio of between about 1 and about 2.

In other features, the angled surface includes an aspect ratio of about 1.5.

In other features, the angled surface includes a contact zone configured to selectively engage the one of the plurality of clutch members.

In other features, the contact zone is defined at about a mid-point of the angled surface.

In other features, the first transmission component includes a clutch support including a support member having an outer surface and a plurality of clutch members supported on the outer surface, the annular groove being formed in the outer surface, and the second transmission component includes a clutch arm supporting a plurality of clutch plates, wherein the retainer ring supports axial forces applied to the plurality of clutch members.

A vehicle according to the present disclosure, includes a body defining a passenger compartment, a plurality of wheels supporting the body, a motor arranged in the body, a transmission operatively connecting the motor and the plurality of wheels. The transmission including a housing having an inner surface. A first transmission component is mounted for axial movement in the housing. The first transmission component includes a first surface having an annular groove. A second transmission component is supported on the first surface adjacent to the annular groove. A retainer ring is positioned in the annular groove to limit axial movement of the second transmission component relative to the first transmission component. The retainer ring includes a trapezium-shaped cross-section including an outwardly facing edge and an inwardly facing edge. One of the outwardly facing edge and the inwardly facing edge is positioned in the annular groove and the other of the outwardly facing edge and the inwardly facing edge includes an angled surface configured to selectively engage with the second transmission component.

In other features, the angled surface includes an angle of between about 30-degrees and about 50-degrees.

In other features, the angled surface includes an angle of about 38-degrees.

In other features, the angled surface includes an aspect ratio of between about 1 and about 2.

In other features, the first transmission component includes a clutch support including a support member having an outer surface and a plurality of clutch members supported on the outer surface, the annular groove being formed in the outer surface, and the second transmission component includes a clutch arm supporting a plurality of clutch plates, wherein the retainer ring supports axial forces applied to the plurality of clutch members.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Retainer rings are ubiquitous. A retainer ring is typically placed in a groove formed in a surface of a first component and used to constrain movement of a second component. The retainer ring projects outwardly from the groove and outwardly from the surface. Often times an axial force is developed on the second component. The axial force causes the second component to axially shift relative to the first component. The second component moves along the first component until encountering the retainer ring. The retainer ring constrains the axial movement of the second component.

The axial movement of the second component exerts an axial pressure on the retainer ring. This axial pressure often causes the retainer ring to cant or lean in the groove. Continued axial pressure may either deform the retainer ring or cause the retainer ring to "pop out" of the groove. In either case, the utility of the retainer ring has been greatly reduced and may allow an undesirable separation of the second component from the first component.

Figure 1:
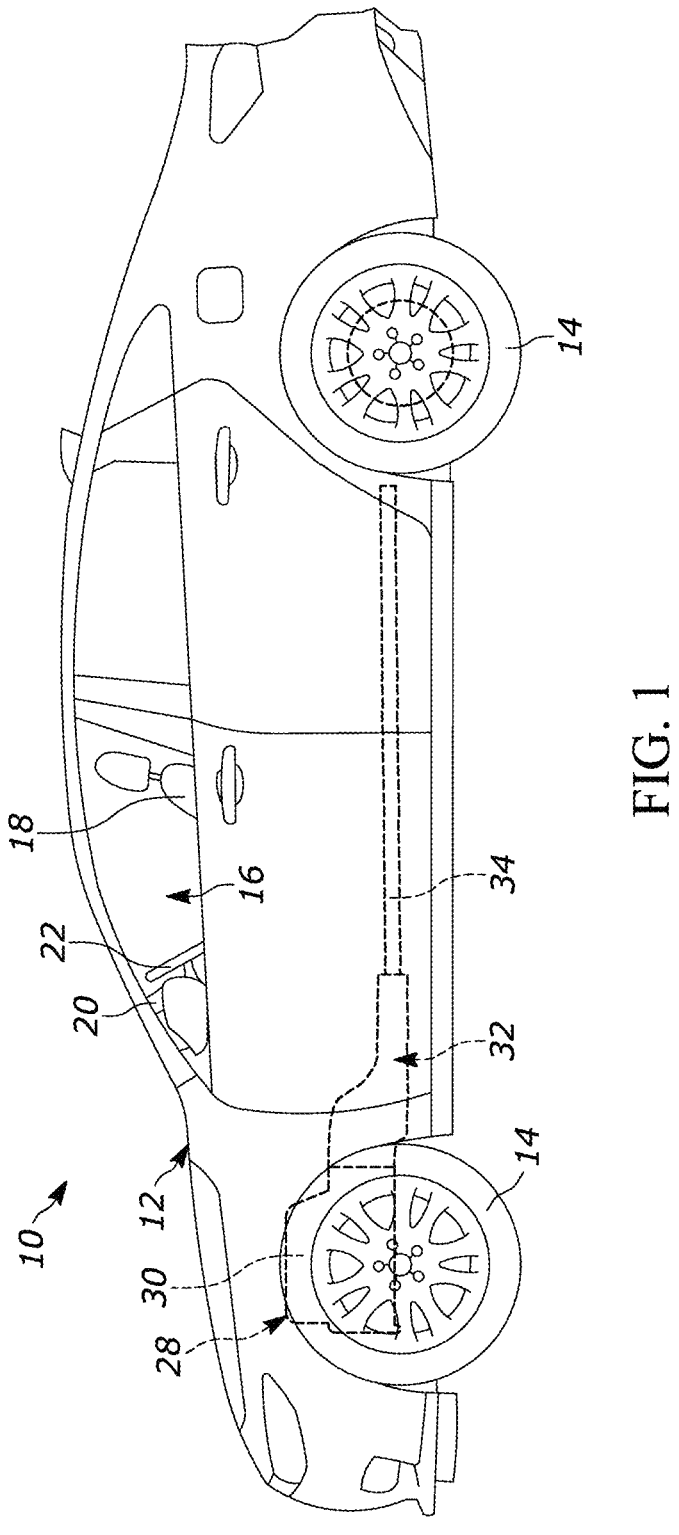
FIG. 1 is a left side view of a vehicle including a transmission having a trapezium-shaped retainer ring, in accordance with the present disclosure.

A vehicle, in accordance with the present disclosure, is indicated generally at 10 in FIG. 1. Vehicle 10 includes a body 12 supported on a plurality of wheels, two of which are indicated at 14. Body 12 defines, in part, a passenger compartment 16 within which are positioned seats 18, a dashboard 20, and a steering wheel 22 arranged between seat 18 and dashboard 20. Body 12 supports a motor 28 which may take the form of an internal combustion engine 30. Motor 28 is operatively connected to a transmission 32 which, in turn, is operatively connected to one or more of the plurality of wheels 14 through a drive shaft 34. At this point, it should be understood that while described in terms of an internal combustion engine and an automatic transmission, vehicle 10 may in the alternative include an electric motor, a hybrid electric motor, and/or a manual transmission.

Figure 2:
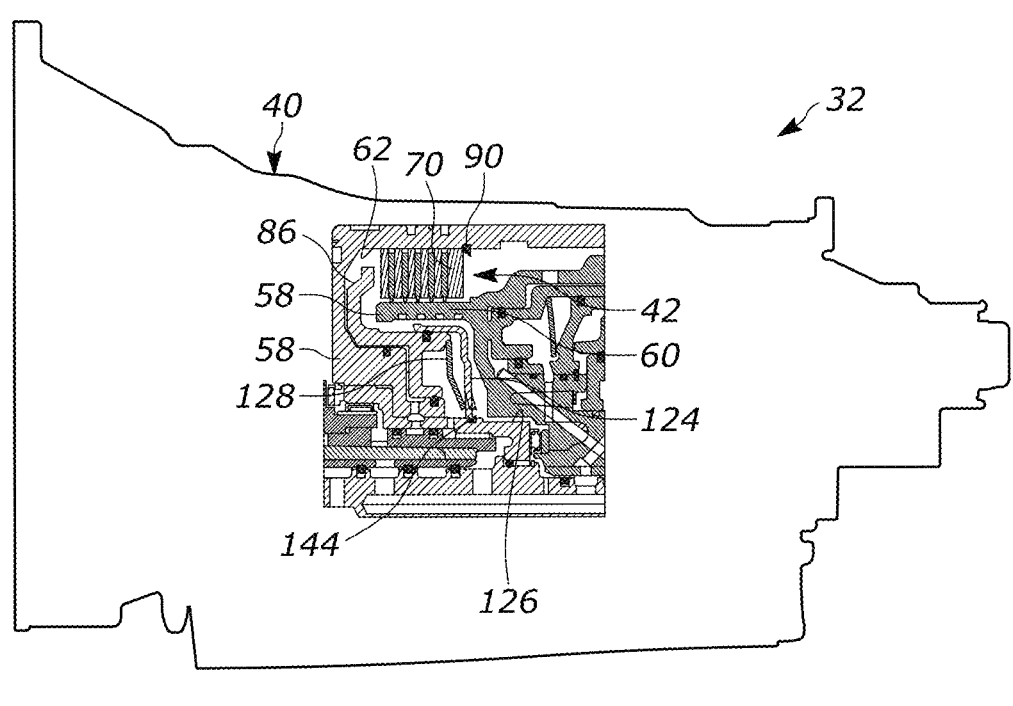
FIG. 2 is a cross-sectional view of the transmission of FIG. 1, in accordance with the present disclosure.

Referring to FIG. 2, transmission 32 includes a housing 40 that surrounds a plurality of clutch systems, one of which is indicated at 42. Housing 40 also surrounds a plurality of gear components (not shown) The gear components are selectively connected to an output shaft (also not shown) that connects with drive shaft 34. Activation of one or more of clutch systems 42 selectively connects one or more of the gear components to the output shaft to establish a selected gear ratio at drive shaft 34.

Figure 3:
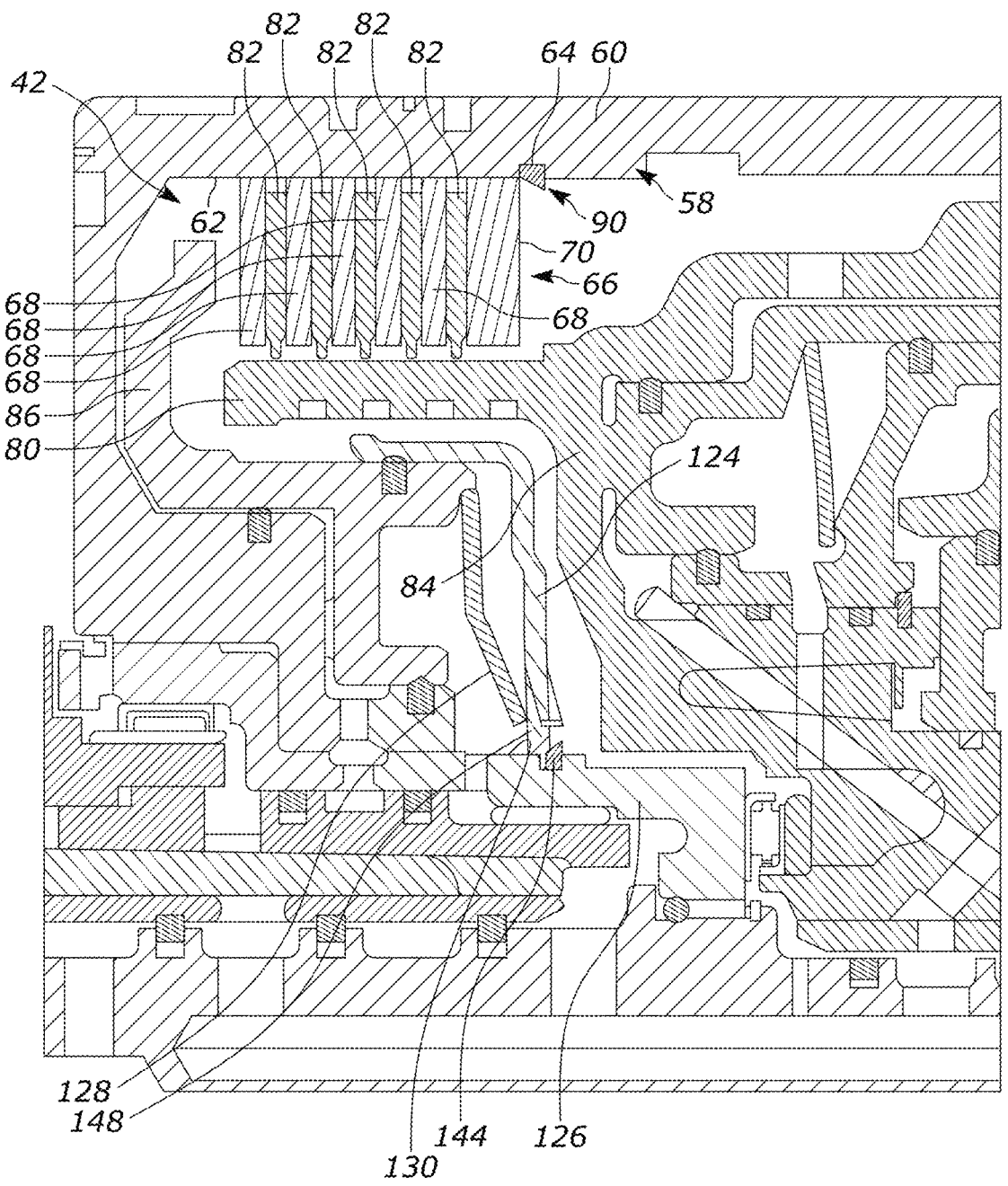
FIG. 3 is a magnified view of a portion of the transmission of FIG. 2 depicting the trapezium-shaped retainer ring securing a clutch pack in a housing of the transmission, in accordance with the present disclosure.

Reference will now follow to FIG. 3 in describing clutch system 42. Clutch system 42 includes a clutch housing 58 including a clutch support 60 having an outer surface 62. An annular groove 64 is formed in outer surface 62. Clutch support 60 supports a plurality of clutch members 66 including a plurality of shiftable clutch plates 68 and a stationary clutch plate 70. The plurality of shiftable clutch plates 68 and the stationary clutch plate 70 are spaced one from another by a plurality of gaps. As will be detailed more fully herein, the plurality of shiftable clutch plates 68 may be shifted along clutch support 60 toward stationary clutch plate 70.

A clutch arm 80 supports a plurality of clutch members 82 that extend into corresponding ones of the gaps defined between adjacent ones of the plurality of shiftable clutch plates 68 and stationary clutch plate 70. Clutch arm 80 is connected to a shaft 84 that is operatively connected to others of the plurality of clutch systems 42 and the gear components. An actuator arm or clutch piston 86 is positioned adjacent to one of the plurality of shiftable clutch plates 68. Clutch piston 86 selectively exerts an axial force on the plurality of shiftable clutch plates 68 thereby clamping and preventing rotation of clutch members 82 to prevent rotation of shaft 84 allowing engagement of select ones of the gear components to transfer power from motor 28 to the one or more of the plurality of wheels 14 through drive shaft 34.

Figure 4:
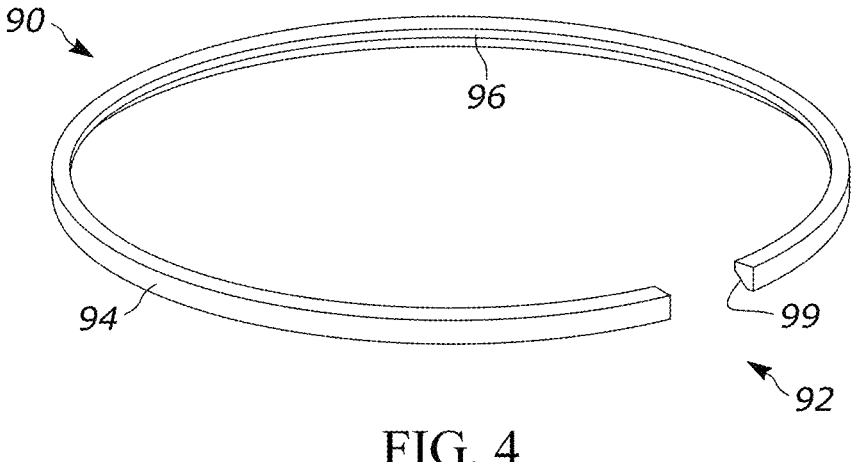
FIG. 4 is a perspective view of the trapezium-shaped retainer ring, in accordance with the present disclosure.

A clutch retaining ring 90 is positioned in annular groove 64 adjacent to stationary clutch plate 70. Clutch retainer ring 90 helps support the axial forces being applied to stationary clutch plate 70 as applied by shiftable clutch plates 68 when engaged by actuator arm 86. As seen in FIG. 4, clutch retaining ring 90 includes a generally annular or circular shape having an interruption 92 so as to define a split ring. Clutch retaining ring 90 includes an outwardly facing edge 94 and an inwardly facing edge 96. In accordance with the present disclosure, outwardly facing edge 94 resides in annular groove 64 and inwardly facing edge 96 is an exposed edge having an angled surface 99.

More specifically, when installed on an inner diameter of a component, such as a housing, a bore, or a support such as shown in FIG. 3, inwardly facing edge 96 becomes the exposed edge. When installed on an outer diameter, such as on a shaft, a flange, or the like, outwardly facing edge 94 becomes the exposed edge. In accordance with the present disclosure, it is the exposed edge that has the angled surface 99. As will be detailed more fully herein, angled surface 99 selectively interacts with stationary clutch plate 70 forcing retaining ring 90 into annular groove 64 to enhance structural support to the axial forces.

Figure 5:
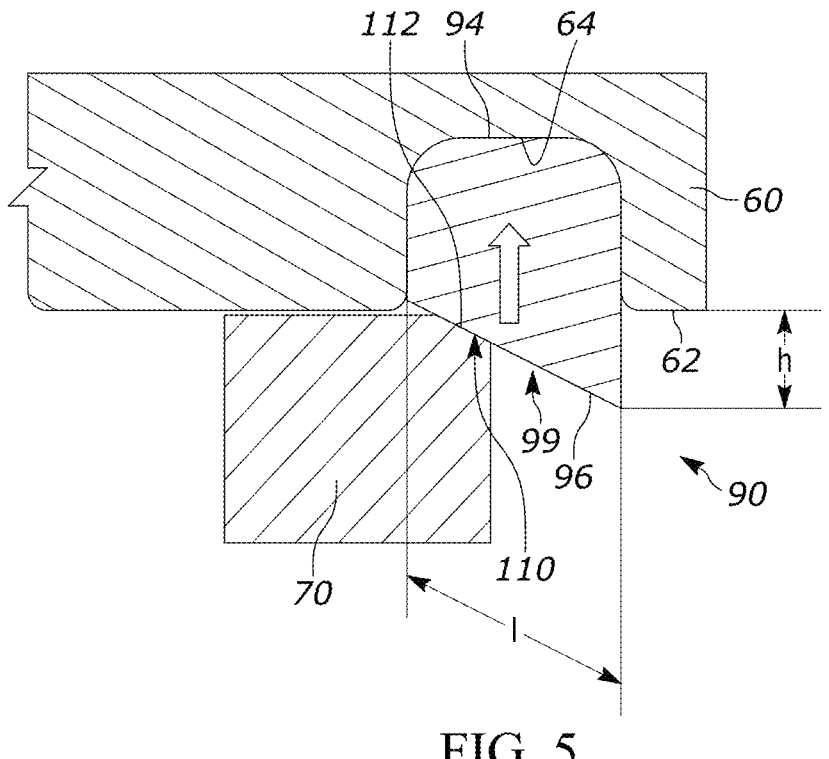
FIG. 5 is a cross-sectional view of the trapezium-shaped retainer ring of FIG. 3, in accordance with the present disclosure.

In accordance with an aspect of the present disclosure shown in FIG. 5, clutch retaining ring 90 includes a trapezium-shaped cross-section and angled surface 99 includes between about a 30-degree angle and about a 50-degree angle. In accordance with another exemplary aspect, angled surface includes about a 38-degree angle. Further, angled surface 99 includes a length (l) and a height (h) and an aspect ratio of between about 1 and 2. In accordance with a non-limiting example, the aspect ratio is about 1.5. The trapezium-shaped cross-section geometry ensures that, when angled surface 99 is engaged by another component, for example, stational clutch plate 70, clutch retaining ring 90 is forced into annular groove 64 without deforming.

Figure 6:
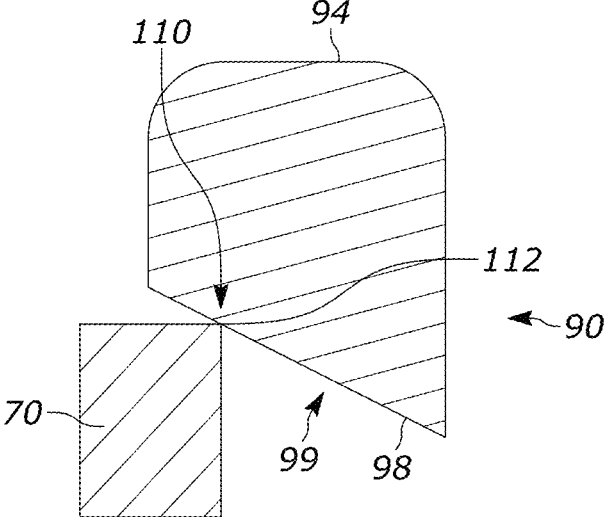
FIG. 6 is a cross-sectional view of the trapezium-shaped retainer ring securing a component, in accordance with another exemplary aspect of the present disclosure.
Figure 7:
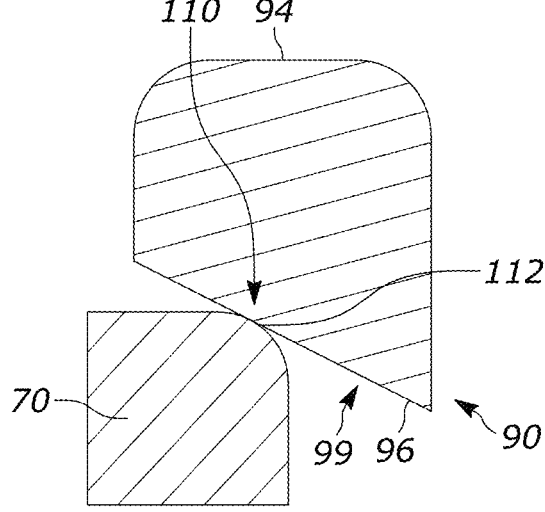
FIG. 7 is a cross-sectional view of the trapezium-shaped retainer ring securing a component, in accordance with yet another exemplary aspect of the present disclosure.

In further accordance with the present disclosure, angled surface 99 includes a contact zone 110 configured to be engaged by an adjacent component, e.g., stational clutch plate 70. As shown in FIG. 5, contact zone 110 is engaged by a contact surface 112 on stationary clutch plate 70. Contact zone 110 extends from about a mid-point of angled surface downward about one-quarter of the length. In accordance with the present disclosure, the shape of contact surface 112 may vary. As shown in FIG. 5, contact surface 112 may take the form of a chamfered surface. In FIG. 6, contact surface 112 is shown to have a 90-degree angled edge. In FIG. 7, contact surface 112 includes a rounded shape.

Figure 8:
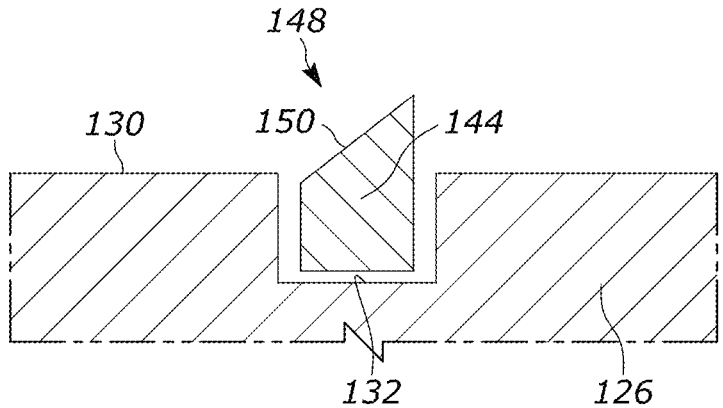
FIG. 8 is a cross-sectional side view of a clutch dam and hub supporting a clutch dam retaining ring, in accordance with another aspect of the present disclosure.

In further accordance with the present disclosure, clutch system 46 is further shown to include a clutch dam 124 that controls and guides movement of clutch piston 86. Clutch dam 124 is supported by a hub 126 that engages a clutch return spring 128 which directs clutch piston 86 away from shiftable clutch plates 68. As sown in FIG. 8, hub 88 includes an outer surface 130 having an annular groove 132 that supports a dam retaining ring 144. Contrary to clutch retaining ring 90, dam retaining ring 144 includes an outwardly facing edge 148 including an angled surface 130 which acts to arrest movement of clutch dam 124. Angled surface 130 is engaged by clutch dam 124 in a manner similar to that discussed herein with respect to clutch retaining ring 90.

The retaining ring constructed in accordance with the present disclosure includes a trapezium-shaped cross-section featuring an angled exposed surface. The angled, exposed surface, when engaged by a component, reacts with a downward movement force into a groove to provide enhanced support for axial forces without deforming. This ensures that the retaining ring remains in the groove and acting to limit axial movement of an adjacent component. Further, while shown in the context of a vehicle transmission, it should be readily apparent that the retaining ring in accordance with the present disclosure, would be equally beneficial in non-vehicle based applications.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

What is claimed is:

1. A component system comprising:
a first component having a first surface, the first surface including an annular groove;
a second component positioned on the first surface of the first component adjacent to the annular groove; and
a retainer ring positioned in the annular groove to limit axial movement of the second component relative to the first component, the retainer ring including a trapezium-shaped cross-section including an outwardly facing edge and an inwardly facing edge, wherein one of the outwardly facing edge and the inwardly facing edge is positioned in the annular groove and the other of the outwardly facing edge and the inwardly facing edge includes an angled surface configured to selectively engage with the second component, wherein the second component contacts only a portion of the angled surface, the portion of the angled surface being less than 75% of the angled surface.

2. The component system according to claim 1, wherein the angled surface includes an angle of between about 30-degrees and about 50-degrees.

3. The component system according to claim 2, wherein the angled surface includes an angle of about 38-degrees.

4. The component system according to claim 1, wherein the angled surface includes an aspect ratio of between about 1 and about 2.

5. The component system according to claim 4, wherein the angled surface includes an aspect ratio of about 1.5.

6. The component system according to claim 1, wherein the angled surface includes a contact zone configured to selectively engage the second component.

7. The component system according to claim 6, wherein the contact zone is defined at about a mid-point of the angled surface.

8. An automatic transmission comprising:
a housing;
a first transmission component is mounted in the housing, the first transmission component includes a first surface having an annular groove;
a second transmission component is supported on the first surface adjacent to the annular groove; and
a retainer ring is positioned in the annular groove to limit axial movement of the second transmission component relative to the first transmission component, the retainer ring includes a trapezium-shaped cross-section including an outwardly facing edge and an inwardly facing edge, wherein one of the outwardly facing edge and the inwardly facing edge is positioned in the annular groove and the other of the outwardly facing edge and the inwardly facing edge includes an angled surface configured to selectively engage with the second transmission component.

9. The automatic transmission according to claim 8, wherein the angled surface includes an angle of between about 30-degrees and about 50-degrees.

10. The automatic transmission according to claim 9, wherein the angled surface includes an angle of about 38-degrees.

11. The automatic transmission according to claim 8, wherein the angled surface includes an aspect ratio of between about 1 and about 2.

12. The automatic transmission according to claim 11, wherein the angled surface includes an aspect ratio of about 1.5.

13. The automatic transmission according to claim 8, wherein the angled surface includes a contact zone configured to selectively engage the second transmission component.

14. The automatic transmission according to claim 13, wherein the contact zone is defined at about a mid-point of the angled surface.

15. The automatic transmission according to claim 8, wherein the first transmission component includes a clutch support including a support member having an outer surface and a plurality of clutch members supported on the outer surface, the annular groove being formed in the outer surface, and the transmission further comprising a shaft having a clutch arm supporting a plurality of clutch plates, wherein the retainer ring supports axial forces applied to the plurality of clutch members.

16. A vehicle comprising:
    a body defining a passenger compartment;
    a plurality of wheels supporting the body;
    a motor arranged in the body; and
    a transmission operatively connecting the motor and the plurality of wheels, the transmission comprising:
        a housing;

a first transmission component is mounted in the housing, the first transmission component includes a first surface having an annular groove;
        a second transmission component is supported on the first surface adjacent to the annular groove; and
        a retainer ring is positioned in the annular groove to limit axial movement of the second transmission component relative to the first transmission component, the retainer ring includes a trapezium-shaped cross-section including an outwardly facing edge and an inwardly facing edge, wherein one of the outwardly facing edge and the inwardly facing edge is positioned in the annular groove and the other of the outwardly facing edge and the inwardly facing edge includes an angled surface configured to selectively engage with the second transmission component.

17. The vehicle according to claim 16, wherein the angled surface includes an angle of between about 30-degrees and about 50-degrees.

18. The vehicle according to claim 17, wherein the angled surface includes an angle of about 38-degrees.

19. The vehicle according to claim 18, wherein the angled surface includes an aspect ratio of between about 1 and about 2.

20. The vehicle according to claim 16, wherein the first transmission component includes a clutch support including a support member having an outer surface and a plurality of clutch members supported on the outer surface, the annular groove being formed in the outer surface, and the transmission further comprising a shaft including a clutch arm supporting a plurality of clutch plates, wherein the retainer ring supports axial forces applied to the plurality of clutch members.

\* \* \* \* \*